United States Patent [19]
Dominiak et al.

[11] Patent Number: 5,754,944
[45] Date of Patent: May 19, 1998

[54] SILENT LINK ESTABLISHMENT

[75] Inventors: Michael Alfred Dominiak, Fairport; Benjamin Moses Vogel, Rochester, both of N.Y.

[73] Assignee: Harris Corporation, Melbourne, Fla.

[21] Appl. No.: 662,124

[22] Filed: Jun. 12, 1996

[51] Int. Cl.$^6$ .................................................. H04B 7/26
[52] U.S. Cl. ...................... 455/32.1; 455/62; 455/509; 455/515
[58] Field of Search ........................ 455/32.1, 38.1, 455/62, 450, 502, 509, 515, 516, 517, 104, 108, 114; 370/330

[56] References Cited

U.S. PATENT DOCUMENTS

| | | |
|---|---|---|
| 4,155,040 | 5/1979 | Harmon et al. |
| 4,679,225 | 7/1987 | Higashiyama. |
| 4,792,984 | 12/1988 | Matsuo. |
| 4,811,420 | 3/1989 | Avis et al. ............... 455/32.1 |
| 4,980,924 | 12/1990 | Reed et al. |
| 5,054,111 | 10/1991 | Goodwin. |
| 5,206,855 | 4/1993 | Schwendeman et al. |
| 5,267,244 | 11/1993 | Messerschmitt et al. ............ 455/32.1 |

*Primary Examiner*—Chi H. Pham
*Attorney, Agent, or Firm*—Rogers & Killeen

[57] ABSTRACT

A method of synchronizing the frequency and time of commencement of high frequency (HF) radio communication between an initiating station and a receiving station in which transmissions from the receiving station are not required. The initiating station determines an optimal frequency from among predetermined HF frequencies for communicating with the receiving station and a time when communication between the initiating and receiving stations is to start. The initiating station transmits an initiation message on each of the predetermined frequencies, where the initiation message provides the optimal frequency and the time until the start of communication. The receiving station scans all of the predetermined frequencies to attempt to receive the initiation message, and upon receipt continuously monitors the optimal frequency and commences a time count-down to the start of communication. Substantive messages are automatically or selectively exchanged between the receiving and initiating stations on the optimal frequency after conclusion of the time count-down.

26 Claims, 1 Drawing Sheet

# SILENT LINK ESTABLISHMENT

BACKGROUND OF THE INVENTION

The present invention relates to methods of establishing radio communication between two stations, and more particularly to a method of synchronizing the commencement of radio communication between an initiating station and a receiving station in which the receiving station need not transmit.

Establishment of a radio communication link between two stations requires coordination of the frequency of transmission and time of transmission, and the present invention is directed to an improved method of providing the frequency and time of transmission from an initiating station which controls commencement of communication to a receiving station from which transmissions are to be minimized. For example, the initiating station may be a central communication facility and the receiving station may be a remote site whose position is desirably undetectable.

One of the problems with prior art methods of establishing a communication link is the need to exchange information for making the link which requires the receiving station to transmit. Transmissions from the receiving station are susceptible to detection, thereby compromising the position of the receiving station. Thus, it is desirable to eliminate entirely transmissions from the receiving station during communication link establishment.

One of the pieces of communication link information that must be conveyed is the radio frequency (or frequencies) on which communication is to take place. As is known, frequencies for radio communication, particularly HF frequencies, are sensitive to environmental and other factors. For example, the optimal HF frequency may vary with time of day, location, antennas, noise, interference, ionospheric conditions, and many other factors.

In the prior art, an optimal frequency is selected using Automatic Link Establishment (ALE) in which both the initiating station and the receiving station are required to transmit. (This process is also known as a three-way signaling handshake.) While ALE may be acceptable for uses where the detection of the receiving station's location is not of concern, ALE is unacceptable for uses where transmission from the receiving station are restricted.

Accordingly, it is an object of the present invention to provide a novel method for synchronizing the frequency and time of commencement of radio communication between an initiating station and a receiving station in which transmissions from the receiving station are not required, and which thereby obviates the problems of the prior art.

It is another object of the present invention to provide a novel method for establishing high frequency (HF) radio communication between an initiating station and a receiving station in which HF transmissions from the receiving station are not required.

It is yet another object of the present invention to provide a novel method of establishing a radio communication link between an initiating station and a receiving station in which the initiating station determines an optimal communication frequency from among predetermined radio frequencies and a time when communication between the initiating and receiving stations is to start, and then transmits an initiation message on each of the predetermined frequencies, where the initiation message provides the optimal frequency and the time until the start of communication.

It is still another object of the present invention to provide a novel method of establishing a radio communication link between an initiating station and a receiving station in which the initiating station transmits an initiation message on each of predetermined frequencies, and in which the receiving station scans all of the predetermined frequencies to attempt to receive the initiation message, and upon receipt continuously monitors the optimal frequency and commences a time count-down to the start of communication.

It is a further object of the present invention to provide a novel method of establishing a radio communication link between an initiating station and a receiving station in which the initiating station transmits an initiation message on each of predetermined frequencies, and in which the receiving station scans all of the predetermined frequencies for the initiation message, and upon receipt commences a time count-down to the start of communication, and in which substantive messages are automatically or selectively exchanged between the receiving and initiating stations on the optimal frequency after conclusion of the time count-down.

It is yet a further object of the present invention to provide a novel method of synchronizing the frequency and time of commencement of HF radio communication between an initiating station and a receiving station in which the initiating station determines an optimal frequency from among predetermined HF frequencies and a time when communication between the initiating and receiving stations is to start, and then transmits an initiation message on each of the predetermined frequencies, where the initiation message provides the optimal frequency and the time until the start of communication, and in which the receiving station scans all of the predetermined frequencies to attempt to receive the initiation message, and upon receipt continuously monitors the optimal frequency and commences a time count-down to the start of communication, and in which substantive messages are automatically or selectively exchanged between the receiving and initiating stations after conclusion of the time count-down.

It is still a further object of the present invention to provide a novel method for establishing high frequency (HF) radio communication between an initiating station and a receiving station in which HF transmissions from the receiving station are not required, in which determination of an optimal frequency is done at the initiating station by monitoring noise and interference levels of all of the predetermined frequencies, predicting propagation properties of selected ones of the predetermined frequencies, and selecting the optimal frequency in consideration of the monitored levels and the predicted propagation properties.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
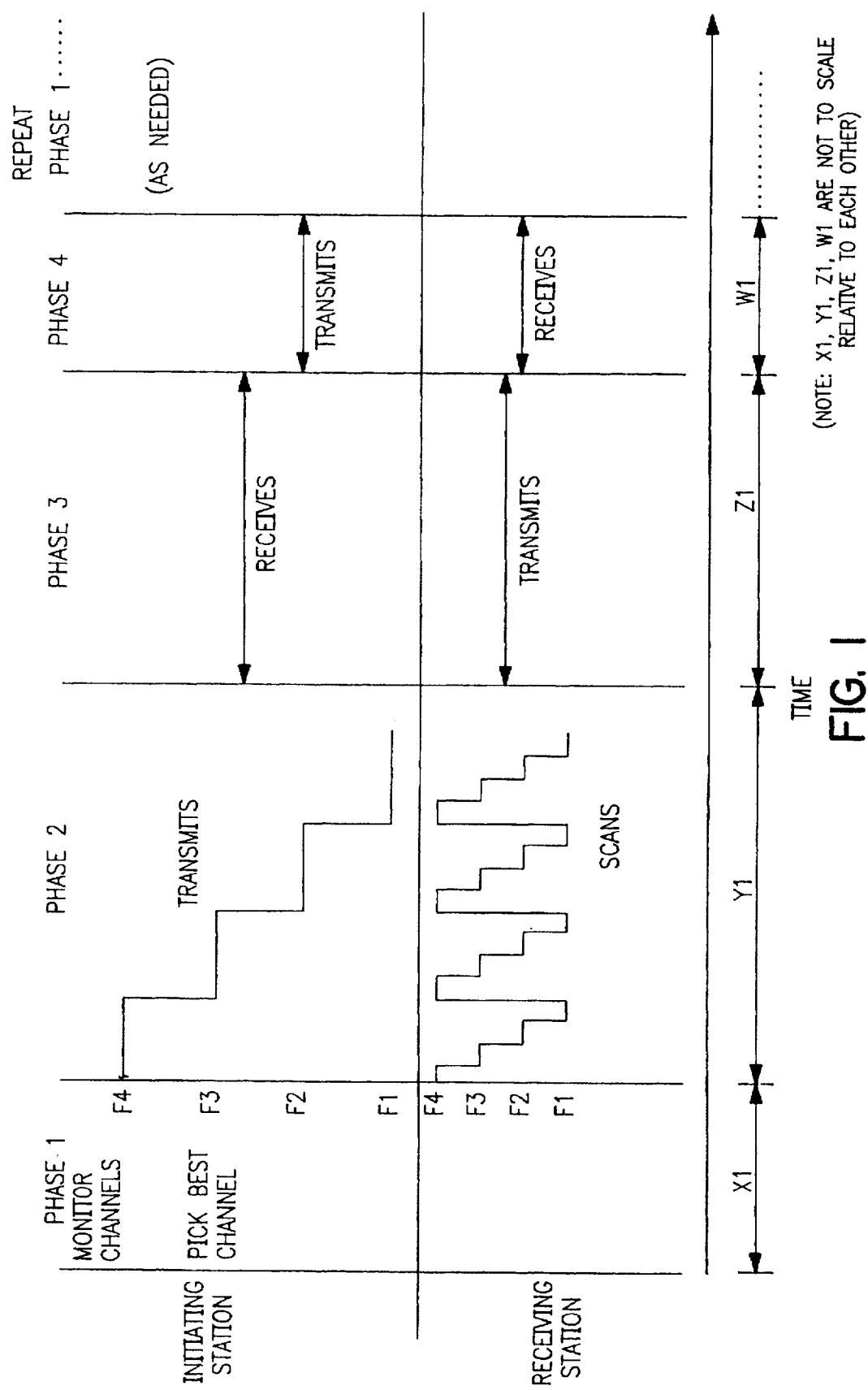
FIG. 1 is a graphical depiction of an embodiment of the method of the present invention showing actions taken by the initiating and receiving stations as functions of time and radio frequency.

In a preferred embodiment of the present invention for synchronizing the frequency and time of commencement of radio communication between an initiating station and a receiving station in which transmissions from the receiving station are not required, the initiating station determines an optimal frequency from among predetermined radio frequencies for communicating with the receiving station and a time when communication between the initiating and receiving stations is to start. The initiating station then transmits an initiation message on each of the predetermined frequencies, where the initiation message provides the determined optimal frequency and the time until the start of communication. The receiving station scans all of the predetermined frequencies to attempt to receive the initiation message, and upon receipt of the message continuously monitors the optimal frequency and commences a time count-down to the start of communication. Substantive messages may then be automatically or selectively exchanged between the receiving and initiating stations on the optimal frequency after conclusion of the time countdown. ("Substantive messages" are any messages other than the initiation message, and may be voice, data, etc. with any content.)

With reference now to FIG. 1, a further preferred embodiment may be a method of establishing high frequency (HF) radio communication between an initiating station and a receiving station in which transmissions from the receiving station are not required. To facilitate an understanding of the method, the method may be described has having four phases.

In the first phase the initiating station determines an optimal frequency from among predetermined HF radio frequencies for communicating with the receiving station. The predetermined frequencies may be any number of frequencies (e.g., ten) known to both the receiving and initiating stations, and may be identified by channel number rather than frequency. The initiating station monitors noise and interference levels of all of the predetermined frequencies, and may select the optimal frequency based on the monitored levels alone. Alternatively, the initiating station may also predict propagation properties of selected ones of the predetermined frequencies using a conventional propagation program and select the optimal frequency in consideration of the predicted propagation properties and the monitored levels. In a further alternative, the initiating station may determine a proposed optimal frequency from among the predetermined frequencies by using a propagation prediction program, monitor noise and interference levels of the proposed optimal frequency, and repeating these two steps until the optimal frequency is determined.

During this phase the initiating station may also determine a time when communication is to start. This time may be provided to the initiating station from a communication controller based on operating considerations (e.g., coordination with other station's transmission schedules, radio silence periods, etc.) or may be arbitrarily selected. In any event the time should be selected to follow transmission of the initiating message in the second phase.

After determining an optimal frequency and communication time, the initiating station prepares an initiation message which includes an indication of the determined optimal frequency, and an indication when communication of substantive messages is to start. The initiation message may include an address of the receiving station, a channel indication of the optimal frequency, the time remaining until start of communication, a flag indicating whether the initiating station has a substantive message for the receiving station, and an address of the initiating station. The initiation message may be compressed before transmission, and its format may be predetermined and known to both the initiating and receiving stations.

The time remaining until start of communication is provided to time synchronize the initiating and receiving stations, and the time remaining is updated as each initiation message is transmitted. In other words, the initiating station sets a time for start of communication and has its own count-down to that time which is provided in the initiation message where the count-down will be picked up the receiving station.

In the second phase the initiating station transmits the initiation message on all of the predetermined frequencies. The initiation message may be transmitted plural times on each of the predetermined frequencies either consecutively on each of the frequencies or by cycling through the frequencies several times. Desirably the message is repeated at least three times and is coded.

Meanwhile the receiving station scans all of the predetermined frequencies to attempt to receive the initiation message. The predetermined frequencies each may be scanned one or more times within a time period of a single initiation message to assure reception. The time period for scanning by the receiving station may be predetermined or may be continuous until receipt of an initiation message. Upon receipt of the initiation message at the receiving station, the receiving station reads the message and switches from scanning all predetermined frequencies to continuously monitoring the optimal frequency indicated in the message. The receiving station also commences its time count-down to the start of communication of substantive messages based on the time remaining count provided in the initiation message. At the conclusion of the time count-down (which is now being kept by both the initiating and receiving stations) the communication of substantive messages may begin on the optimal frequency in sync.

In the final phases, the substantive messages that are to be exchanged between the initiating and receiving stations are transmitted at the conclusion of the time count-down. The sequence and length of transmissions is not significant, so long as both stations are aware of the protocol selected (with due regard for interception of receiving station transmissions.) In a preferred embodiment, substantive messages are transmitted from the initiating station to the receiving station on the optimal frequency at a predetermined time after conclusion of the time count-down and after transmission of substantive messages from the receiving stations which are transmitted at a prior predetermined time after conclusion of the time count-down.

In an alternative embodiment, the substantive messages may be transmitted on the optimal frequency or on a suboptimal frequency at a predetermined time after conclusion of the time count-down, where the suboptimal frequency may be a backup frequency selected and communicated in the manner discussed above for the optimal frequency. The receiving station may use the suboptimal frequency and the initiating station may use the optimal frequency and transmissions therefrom may be overlapping.

After the step of exchanging substantive messages, the initiating station may optionally send a receipt message to the receiving station on the optimal frequency indicating whether a substantive message from the receiving station was received.

At the end of the four phases (and after transmission of the receipt message) the first phase may be repeated as needed and the receiving station may resume its scan of all of the predetermined frequencies to determine whether a further initiation message has been sent from the initiating station or from another initiating station.

In the preferred embodiment, the operation of the two stations is automatic. That is, all messages (initiation and substantive) are sent automatically once the sequence of phases has commenced. The sequence of phases may be started either in response to a command or on a predetermined time schedule.

In a further embodiment, the transmission of substantive messages from the receiving stations may be selectively started by an operator during a time window following the time count-down. The receiving station may provide a visual or aural indication when the time window is open so that the operator can selectively transmit substantive messages. The time window may be provided as part of a transmission schedule to avoid interference from other stations.

The present invention provides the receiving station with a low probability of detection, provides multichannel capability to counter link interference, allows for selection of independent link and traffic channels, conserves power at the receiving station by reducing transmissions, and requires little operator attention. Accordingly, it is especially suited to operations in which the receiving station must be small (e.g., a back pack) and clandestine.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of synchronizing the start of radio communication between an initiating station and a receiving station in which transmissions from the receiving station are not required, the method comprising the steps of:

(a) determining at the initiating station an optimal frequency from among predetermined radio frequencies for communicating with the receiving station and a time when radio communication between the initiating and receiving stations is to start;

(b) transmitting an initiation message plural times from the initiating station on each of the predetermined frequencies, the initiation message providing the determined optimal frequency and the time until the start of radio communication;

(c) scanning at the receiving station all of the predetermined frequencies to attempt to receive the initiation message;

(d) continuously monitoring the optimal frequency and commencing a time count-down to the start of radio communication at the receiving station upon receipt of the initiation message, whereby the start of communication between the initiating and receiving stations is synchronized in frequency and time.

2. The method of claim 1 further comprising the step of transmitting a substantive message from the receiving station to the initiating station on the optimal frequency at a predetermined time after conclusion of the time count-down.

3. The method of claim 2 wherein the step of transmitting the substantive message comprises the step of automatically starting transmission of the substantive message from the receiving station at the predetermined time.

4. The method of claim 2 wherein the step of transmitting the substantive message comprises the step of selectively starting transmission of the substantive message from the receiving station within a time window following the predetermined time.

5. The method of claim 4 further comprising the step of indicating the time window to an operator of the receiving station.

6. The method of claim 1 further comprising the step of transmitting a substantive message from the initiating station to the receiving station on the optimal frequency at a predetermined time after conclusion of the time count-down.

7. The method of claim 1 wherein the initiation message comprises an address of the receiving station, a channel indication of the optimal frequency, the time remaining until start of communication, a flag indicating whether the initiating station has a substantive message for the receiving station, and an address of the initiating station.

8. The method of claim 7 further comprising the step of time compressing the initiation message before transmission thereof.

9. The method of claim 8 wherein the step of scanning all of the predetermined frequencies comprises the step of scanning all of the predetermined frequencies within a time period of a single initiation message.

10. The method of claim 1 wherein the step of determining an optimal frequency comprises the steps of monitoring noise and interference levels of all of the predetermined frequencies, and selecting the optimal frequency based on the monitored levels.

11. The method of claim 10 wherein the step of selecting the optimal frequency further comprises the steps of predicting propagation properties of selected ones of the predetermined frequencies and selecting the optimal frequency in consideration of the predicted propagation properties.

12. The method of claim 11 wherein all of the predetermined frequencies are high frequency (HF).

13. A method of establishing high frequency (HF) radio communication between an initiating station and a receiving station in which transmissions from the receiving station are not required, the method comprising the steps of:

(a) determining at the initiating station an optimal frequency from among predetermined HF radio frequencies for communicating with the receiving station;

(b) preparing at the initiating station an initiation message which includes an indication of the determined optimal frequency, and an indication when communication of substantive messages is to start;

(c) transmitting the initiation message from the initiating station on all of the predetermined frequencies;

(d) scanning at the receiving station all of the predetermined frequencies to attempt to receive the initiation message transmitted from the initiation station;

(e) upon receipt of the initiation message at the receiving station, continuously monitoring the optimal frequency and commencing a time count-down to the start of communication of substantive messages; and (f) communicating the substantive messages that are to be exchanged between the initiating and receiving stations at the conclusion of the time count-down.

14. The method of claim 13 wherein the step of communicating the substantive messages comprises the steps of transmitting a substantive message from the initiating station to the receiving station on the optimal frequency at a predetermined time after conclusion of the time count-down.

15. The method of claim 13 wherein the step of communicating the substantive messages comprises the steps of transmitting a substantive message from the receiving station to the initiating station on the optimal frequency at a predetermined time after conclusion of the time count-down.

16. The method of claim 15 wherein the step of communicating the substantive messages further comprises the step of transmitting a substantive message from the initiating station to the receiving station on the optimal frequency after conclusion of the substantive message from the receiving station.

17. The method of claim 13 wherein the step of communicating the substantive messages comprises the step of transmitting a substantive message on the optimal frequency or a suboptimal frequency at a predetermined time after conclusion of the time count-down.

18. The method of claim 13 further comprising the step of time compressing the initiation message before transmission thereof.

19. The method of claim 13 wherein the step of scanning all of the predetermined frequencies comprises the step of scanning all of the predetermined frequencies within a time period of a single transmission of the initiation message.

20. The method of claim 13 wherein the step of transmitting the initiation message comprises the step of transmitting the initiation message plural times on each of the predetermined frequencies.

21. The method of claim 13 wherein the step of determining an optimal frequency comprises the steps of monitoring noise and interference levels of all of the predetermined frequencies, and selecting the optimal frequency based on the monitored levels.

22. The method of claim 21 wherein the step of selecting the optimal frequency further comprises the steps of predicting propagation properties of selected ones of the predetermined frequencies and selecting the optimal frequency in consideration of the predicted propagation properties.

23. The method of claim 13 wherein the step of determining an optimal frequency comprises the steps of determining a proposed optimal frequency from among the predetermined frequencies using a propagation prediction method, monitoring noise and interference levels of the proposed optimal frequency, and repeating these two steps until the optimal frequency is determined.

24. The method of claim 13 wherein the initiation message comprises an address of the receiving station, a channel indication of the optimal frequency, a flag indicating whether the initiating station has a substantive message for the receiving station, and an address of the initiating station.

25. The method of claim 13, after the step of exchanging substantive messages, further comprising the step of transmitting a receipt message from the initiating station to the receiving station on the optimal frequency indicating whether a substantive message from the receiving station was received at the initiating station.

26. The method of claim 13, after transmission of the receipt message, further comprising the step of scanning at the receiving station all of the predetermined frequencies to determine whether a further initiation message has been sent from the initiating station.

* * * * *